(12) United States Patent
Kley et al.

(10) Patent No.: US 7,694,519 B2
(45) Date of Patent: Apr. 13, 2010

(54) TURBINE COMPOUND SYSTEM

(75) Inventors: Markus Kley, Ellwangen (DE); Kai Kamossa, Crailsheim (DE); Kurt Adleff, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 481 days.

(21) Appl. No.: 10/586,223

(22) PCT Filed: Jan. 14, 2005

(86) PCT No.: PCT/EP2005/000347

§ 371 (c)(1),
(2), (4) Date: May 31, 2007

(87) PCT Pub. No.: WO2005/068801

PCT Pub. Date: Jul. 28, 2005

(65) Prior Publication Data

US 2007/0283699 A1 Dec. 13, 2007

(51) Int. Cl.
*F02G 3/00* (2006.01)
*F16D 3/00* (2006.01)
*F16D 57/04* (2006.01)
*F16H 47/00* (2006.01)

(52) U.S. Cl. .............. 60/624; 60/614; 74/720; 74/732.1; 188/274

(58) Field of Classification Search .......... 60/624, 60/614, 605.1; 74/720, 732.1; 188/274
See application file for complete search history.

(56) References Cited

U.S. PATENT DOCUMENTS

| 4,114,734 A | * | 9/1978 | Bultmann | 188/274 |
| 4,237,748 A | * | 12/1980 | Brimmer et al. | 74/732.1 |
| 4,748,812 A | | 6/1988 | Okada et al. | 60/614 |
| 4,800,726 A | * | 1/1989 | Okada et al. | 60/624 |
| 4,843,822 A | * | 7/1989 | Okada | 60/624 |
| 4,858,440 A | * | 8/1989 | Okada | 60/624 |
| 4,882,906 A | * | 11/1989 | Sekiyama et al. | 60/624 |
| 4,884,407 A | * | 12/1989 | Hatanaka | 60/624 |
| 4,894,992 A | * | 1/1990 | Sekiyama | 60/624 |

(Continued)

FOREIGN PATENT DOCUMENTS

EP   0 272 680 A2   6/1988

(Continued)

OTHER PUBLICATIONS

International Search Report based on PCT/EP2005/0002347 dated Apr. 15, 2005.

*Primary Examiner*—Thai Ba Trieu
(74) *Attorney, Agent, or Firm*—Ohlandt, Greeley, Ruggiero & Perle, L.L.P.

(57) ABSTRACT

A turbo-compound system having a crankshaft driven by an internal combustion engine; having an exhaust gas turbine arranged in the flow of exhaust gas of the internal combustion engine; having a hydrodynamic coupling, having a primary impeller and a secondary impeller, together forming a working chamber which may be filled or is filled with a working medium, which is arranged in a driven connection between the crankshaft and the exhaust gas turbine in such a way that, when the working chamber of the hydrodynamic coupling is filled, for the exhaust gas turbine driven by the exhaust-gas flow, drive power is transmitted from the exhaust gas turbine to the crankshaft.

20 Claims, 1 Drawing Sheet

U.S. PATENT DOCUMENTS

Figure 1:
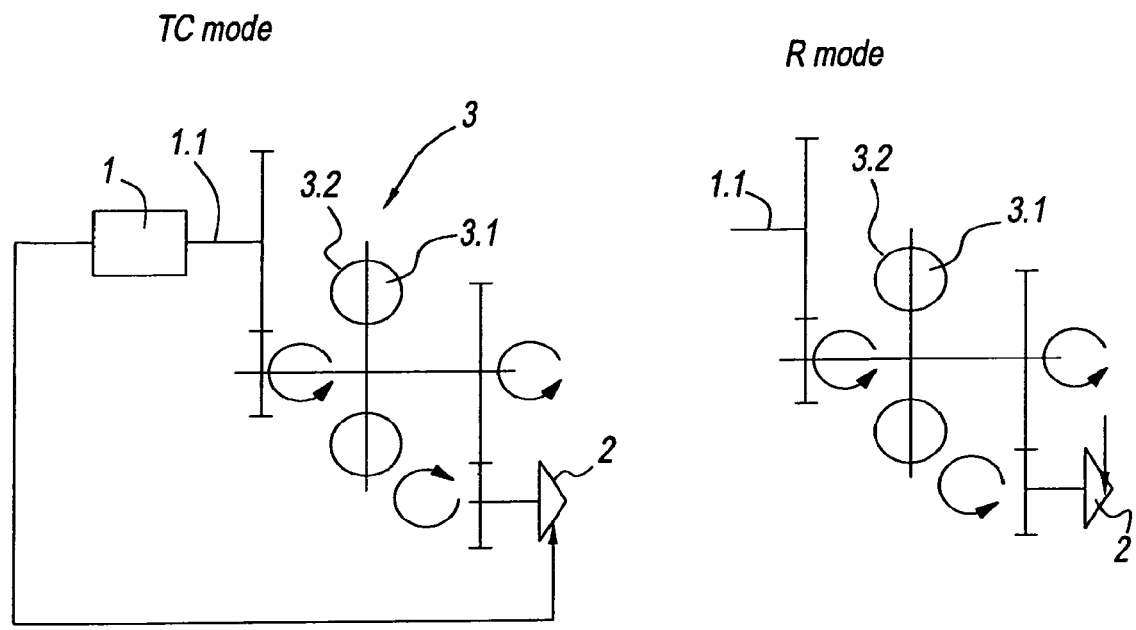

| | | | |
|---|---|---|---|
| 4,897,998 A * | 2/1990 | Sekiyama et al. | 60/624 |
| 5,323,612 A * | 6/1994 | Werner | 60/605.1 |
| 5,700,219 A * | 12/1997 | Ohkubo | 475/47 |
| 5,884,482 A | 3/1999 | Lange et al. | 60/624 |
| 6,886,337 B2 * | 5/2005 | Friedrich et al. | 60/624 |
| 2007/0272052 A1 * | 11/2007 | Adleff | 74/720 |
| 2008/0216477 A1 * | 9/2008 | Kley et al. | 60/624 |

FOREIGN PATENT DOCUMENTS

| | | |
|---|---|---|
| EP | 0 297 287 A1 | 1/1989 |
| EP | 0 301 547 A2 | 2/1989 |
| JP | 61286531 A * | 12/1986 |

* cited by examiner

TURBINE COMPOUND SYSTEM

RELATED APPLICATIONS

This application claims priority in PCT International Application No. PCT/EP2005/000347, filed Jan. 14, 2005, and German Application No. DE 10 2004 002 215.1, filed on Jan. 15, 2004, the disclosures of which are incorporated herein by reference.

The invention relates to a turbo-compound system, that is, a system for increasing the efficiency of transmission of exhaust-gas energy of an internal combustion engine, which is arranged in a drive train, via an exhaust gas turbine and a hydrodynamic coupling to the crankshaft of the internal combustion engine. The system that the invention relates to could also be referred to as a turbo-compound/retarder system, because, at the same time, it has a retarder function, that is, it can afford a braking effect on the crankshaft of the internal combustion engine, when this is required.

Turbo-compound systems as well as turbo-compound retarder systems are known to the person skilled in the art. The latter systems, in particular, have, as a rule, a hydrodynamic coupling, which serves for torque transmission between the exhaust gas turbine and the crankshaft of the internal combustion engine. In order to provide the described braking function, as a rule, either a blade wheel of the hydrodynamic coupling is mechanically fixed in place, so that a retarder is functionally created from the hydrodynamic coupling, or the exhaust gas turbine is operated as a compressor; see, for example, the U.S. Pat. No. 5,884,482. In regard to the last-named system, it is also known to reverse the direction of rotation of the exhaust gas turbine in braking operation in order to produce a higher braking torque; see, for example, U.S. Pat. No. 4,748,812.

Although these systems achieve a certain braking effect in braking operation, it has been shown in practice that the switching to the exhaust gas turbine as a compressor has not applied a satisfactory uniform braking torque on the crankshaft. In the systems with a fixed blade wheel of the hydrodynamic coupling, by contrast, the braking torque produced during retarder operation of the hydrodynamic coupling, by means of which the crankshaft of the internal combustion engine is braked, depends strongly on the rpm and is accordingly likewise non-uniform.

The object of the invention is to present a turbo-compound system, which provides a particularly uniform and high braking torque in the overrun of the internal combustion engine, in particular, which can be accurately predicted and controlled.

The turbo-compound system according to the invention comprises an internal combustion engine having a driven crankshaft as well as an exhaust gas utilization turbine disposed in the flow of exhaust gas of the internal combustion engine. In the driven connection between the exhaust gas turbine and the crankshaft, a hydrodynamic coupling is connected, which comprises a primary impeller and a secondary impeller, which together form a working chamber. The working chamber is filled or can be filled with a working medium, oil in particular, so that torque is transmitted from the primary impeller to the secondary impeller or from the secondary impeller to the primary impeller, depending on which side, the primary side or the secondary side, is driven from the outside. In the sense of uniform denotation, for describing the present invention, the blade wheel of the hydrodynamic coupling which is disposed on the side of the exhaust gas turbine and in particular, in a direct mechanical driven connection with the exhaust gas turbine, is denoted the primary impeller. Correspondingly, the secondary impeller in the sense of the present invention is the blade wheel of the hydrodynamic coupling, which is disposed on the side of the crankshaft and, in particular, stands in a direct mechanical driven connection with the crankshaft, or can be switched to such connection.

In the so-called "turbocoupling mode", also called "turbo-compound mode", the exhaust gas turbine is driven by the flow of exhaust gas of the internal combustion engine, i.e., the exhaust gas turbine converts exhaust gas energy into rotational movement, and this drive power is transmitted from the primary impeller of the hydrodynamic coupling, which stands in a driven connection with the exhaust gas turbine, i.e., with the turbine wheel of the exhaust gas turbine, to the secondary impeller via the working medium in the working chamber of the hydrodynamic coupling, and is further transmitted to the crankshaft of the drive engine, which stands in a driven connection with the secondary impeller. Thus far, the design of the present invention does not differ from the prior art.

The turbo-compound system according to the invention, however, additionally has a switching means for reversing the direction of rotation of the primary impeller or of the secondary impeller of the hydrodynamic coupling, so that in so-called "retarder mode", i.e., in an operating state of the turbo-compound system, in which a braking power will be introduced on the crankshaft of the internal combustion engine, in particular, if the engine is found in overrun mode, the primary impeller and the secondary impeller of the hydrodynamic coupling will rotate in opposite directions to one another and thus form a so-called counter-rotating retarder.

The advantages of the counter-rotating retarder function of the turbo-compound system according to the invention are the development of a particularly high braking torque as well as a uniform torque course, or a more uniform torque course in comparison to the prior art, over a large rpm range of the hydrodynamic coupling, for example, referred to the input rpm of the hydrodynamic coupling.

The switching means according to the invention may be provided in various designs. According to a first embodiment, the switching means according to the invention bring about a reversal of the direction of rotation of the turbine wheel of the exhaust gas turbine, so that the primary impeller of the hydrodynamic coupling is reversed when compared with the "coupling mode". For this purpose, the switching means according to the invention are shaped in the form of a flow conducting device, for example, in the form of a conducting apparatus or a conducting grid of the exhaust gas turbine. According to the described embodiment, the flow of the turbine wheel of the the exhaust gas turbine is modified by this conducting grid in such a way that the desired reversal of the direction of rotation is established.

According to a second embodiment of the invention, the switching means comprises a switching gear or the switching means is shaped in the form of a switching gear. The switching gear according to an advantageous embodiment may be a reversing gear, which is disposed in the driven connection between the crankshaft and the secondary impeller of the hydrodynamic coupling. In a first switching state (coupling mode), the secondary impeller drives the crankshaft of the internal combustion engine via the switching gear, whereupon it rotates in a first direction. In a second switching state, the crankshaft drives the secondary impeller via the switching gear (retarder mode), whereupon, in this state, the secondary impeller rotates with a second direction of rotation by means of a corresponding switching over of the switching gear formed as a reversing gear, and this direction is opposite to the first direction of rotation.

According to an alternative embodiment, a corresponding reversing gear is disposed in the driven connection between the exhaust gas turbine and the primary impeller of the hydrodynamic coupling. Correspondingly, the primary impeller of the hydrodynamic coupling rotates in the two switching positions of the reversing gear in directions opposite to one another.

According to another embodiment of the turbo-compound system according to the invention, a switching gear is disposed parallel to the hydrodynamic coupling and comprises a shift coupling, by means of which the primary impeller and the secondary impeller of the hydrodynamic coupling can be switched into a mechanical driven connection such that the two impellers rotate in opposite directions to one another. Thus in the retarder mode, the secondary impeller of the hydrodynamic coupling is driven by the crankshaft in a first direction, whereas the primary impeller is also driven (indirectly) by means of the crankshaft in a second, opposite direction, so that the hydrodynamic coupling operates as a counter-rotating retarder.

The shift coupling disposed parallel to the hydrodynamic coupling can be designed as a multidisk coupling or also as a hydrodynamic coupling. The switching gear is particularly designed in the form of a planetary gear with a shift coupling.

According to an advantageous embodiment, in the retarder mode, the primary impeller and the secondary impeller rotate in opposite directions of rotation with rpm's that differ in magnitude from one another. In this way, a particularly high braking power is achieved. Alternatively it is possible, in the retarder mode, to let the primary impeller and the secondary impeller rotate in opposite directions of rotation with rpm's that are the same in magnitude.

The invention will be explained in more detail below on the basis of different embodiment examples and the figures.

Figure 2:
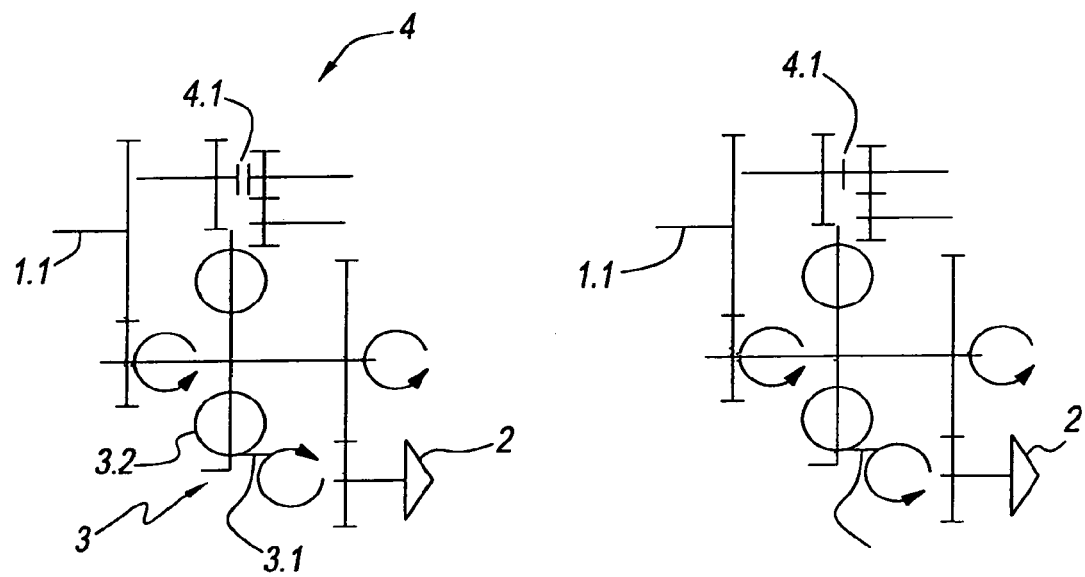

Herein is shown:

FIG. 1 a first embodiment of the invention with a change in the flow of the exhaust gas turbine in turbocoupling mode and in retarder mode due to shifting the position of a conducting grid of the exhaust gas turbine;

FIG. 2 a second embodiment of the invention with a switching gear, comprising a shift coupling, between the primary impeller and the secondary impeller of the hydrodynamic coupling.

In FIG. 1 is recognized a turbo-compound system according to the invention with an internal combustion engine 1, whose crankshaft 1.1, in the turbocoupling mode (also called turbo-compound mode) is driven via the hydrodynamic coupling 3, whose working chamber is filled with working medium between primary impeller 3.1 and secondary impeller 3.2, and also is driven by the exhaust gas turbine 2 disposed in the exhaust gas flow of the internal combustion engine 1. Here, a gear is disposed on both sides of the hydrodynamic coupling 3, i.e., between the crankshaft 1.1 and the secondary impeller 3.2 as well as between the exhaust gas turbine 2 and the primary impeller 3.1. As can be seen, the targeted introduction of the flow of exhaust gas to the exhaust gas turbine or through the conducting grid to the turbine wheel of the exhaust gas turbine leads to a first direction of rotation of the primary impeller 3.1 of the hydrodynamic coupling in the turbocoupling mode.

In the retarder mode, in contrast, the conducting of the flow of exhaust gas has been switched over or reversed in comparison to the turbocoupling mode such that the direction of rotation of the exhaust gas turbine 2 and thus of the primary impeller 3.1 of the hydrodynamic coupling 3 has reversed. Correspondingly, in retarder mode, the primary impeller 3.1 and the secondary impeller 3.2 rotate in opposite directions, while these two impellers 3.1, 3.2 rotate continually in the same direction in the turbocoupling mode, as shown.

The reversal of the direction of rotation of the exhaust gas turbine 2 can be achieved either by shifting the position of the conducting grid of the exhaust gas turbine or by means of a reversal of the introduction of the exhaust-gas flow, for example, from a first intake to a second intake.

In FIG. 2 is shown an alternative configuration of a switching means for reversing the direction of rotation of primary impeller 3.1 of the hydrodynamic coupling 3 in the retarder mode in comparison to the turbocoupling mode. As can be seen, a switching gear 4, which comprises a shift coupling, 4.1 is disposed parallel to the hydrodynamic coupling 3. In the turbocoupling mode, the shift coupling is switched to the opened state, so that a mechanical driven connection does not exist between primary impeller 3.1 and secondary impeller 3.2 of the hydrodynamic coupling 3, and the secondary impeller 3.2 is driven by the primary impeller 3.1 exclusively via the circuit flow of working medium in the working chamber of the hydrodynamic coupling, so that both impellers 3.1, 3.2 rotate in the same direction. In the retarder mode, in contrast, the shift coupling 4.1 is closed, so that the primary impeller 3.1 of the hydrodynamic coupling is driven by the crankshaft 1.1 with a direction of rotation that is opposite to the direction of rotation of the secondary impeller 3.2.

Thus, at the same time, the exhaust gas turbine is driven in a direction opposite the direction of rotation in the turbocoupling mode and thus operates as a compressor or "air pump", which contributes additional braking torque to the braking of the crankshaft 1.1.

Thus, in the embodiment shown in FIG. 2, in the turbocoupling mode, the torque transfer onto crankshaft 1.1 is produced purely hydrodynamically by the exhaust gas turbine, while in the retarder mode, the two impellers—primary impeller 3.1 and secondary impeller 3.2— of the hydrodynamic coupling are mechanically driven in opposite directions, and the hydrodynamic coupling 3 takes on the function of a counter-rotating retarder.

The invention claimed is:

1. A method of forming a counter-rotating hydrodynamic retarder comprising:

forming a working chamber of a hydrodynamic coupling by providing a primary impeller and a secondary impeller;

filling the working chamber with a working medium;

transmitting driving power from an exhaust gas turbine to a crankshaft of an internal combustion engine when the working chamber is filled with the working medium; and reversing a direction of rotation of the primary impeller or the secondary impeller by changing a direction of flow of an exhaust gas flow path of the internal combustion engine, wherein the primary impeller and the secondary impeller rotate in opposite directions with respect to each other in a first switching state, and wherein the primary impeller and the secondary impeller rotate in a same direction with respect to each other in a second switching state.

2. A hydrodynamic coupling for a turbine system of an internal combustion engine, the turbine system having an exhaust gas turbine, the internal combustion engine having a crank shaft and an exhaust gas flow path, the coupling comprising:

a primary impeller;

a secondary impeller;

a working chamber defined at least in part by the primary and secondary impellers, the working chamber being filled with a working medium; and a switching member for reversing a direction of rotation of the primary impeller or the secondary impeller, wherein the switching member has a first switching state and a second switching state, wherein the primary impeller and the secondary impeller rotate in opposite directions with respect to each other in the first switching state, and wherein the primary impeller and the secondary impeller rotate in a same direction with respect to each other in the second switching state.

3. The coupling according to claim 2, wherein the switching member comprises a flow conducting device in the exhaust gas flow path that reverses the direction of rotation of the primary impeller by changing the direction of flow of the exhaust gas flow path.

4. The coupling according to claim 3, wherein the flow conducting device comprises a conducting apparatus of the exhaust gas turbine.

5. The coupling according to claim 2, wherein the switching member comprises a switching gear.

6. The coupling according to claim 5, wherein the switching gear is a reversing gear positioned between the crankshaft and the secondary impeller.

7. The coupling according to claim 5, wherein the switching gear is a reversing gear positioned between the exhaust gas turbine and the primary impeller.

8. The coupling according to claim 5, wherein the switching gear is disposed parallel to the hydrodynamic coupling and comprises a shift coupling for switching the primary impeller and the secondary impeller to a mechanical driven connection with opposite directions of rotation.

9. The coupling according to claim 8, wherein the shift coupling is a multi-disk coupling.

10. The coupling according to claim 8, wherein the shift coupling is a hydrodynamic coupling.

11. The coupling according to claims 8, wherein the switching gear is a planetary gear with a shift coupling.

12. A turbine system for an internal combustion engine having a crank shaft and an exhaust gas flow path, the system comprising:

an exhaust gas turbine in communication with the exhaust-gas flow of the internal combustion engine;

a hydrodynamic coupling having a primary impeller and a secondary impeller defining at least in part a working chamber filled with a working medium, the hydrodynamic coupling being operably connected between the crankshaft and the exhaust gas turbine, wherein driving power is transmitted from the exhaust gas turbine to the crankshaft when the working chamber is filled with the working medium; and a switching member for reversing a direction of rotation of the primary impeller or the secondary impeller, wherein the switching member has a first switching state and a second switching state, wherein the primary impeller and the secondary impeller rotate in opposite directions with respect to each other in the first switching state, and wherein the primary impeller and the secondary impeller rotate in a same direction with respect to each other in the second switching state.

13. The system according to claim 12, wherein the switching member comprises a flow conducting device in the exhaust gas flow that reverses the direction of rotation of the primary impeller by changing the direction of flow of the exhaust gas flow.

14. The system according to claim 13, wherein the flow conducting device comprises a conducting apparatus of the exhaust gas turbine.

15. The system according to claim 12, wherein the switching member comprises a switching gear.

16. The system according to claim 15, wherein the switching gear is a reversing gear positioned between the crankshaft and the secondary impeller.

17. The system according to claim 15, wherein the switching gear is a reversing gear positioned between the exhaust gas turbine and the primary impeller.

18. The system according to claim 15, wherein the switching gear is disposed parallel to the hydrodynamic coupling and comprises a shift coupling for switching the primary impeller and the secondary impeller to a mechanical driven connection with opposite directions of rotation.

19. The system according to claim 18, wherein the shift coupling is a multi-disk coupling.

20. The system according to claim 18, wherein the switching gear is a planetary gear with a shift coupling.

* * * * *